United States Patent
Mizuta et al.

(10) Patent No.: US 7,966,463 B2
(45) Date of Patent: Jun. 21, 2011

(54) ASYNCHRONOUS REMOTE COPY SYSTEM AND CONTROL METHOD FOR THE SAME

(75) Inventors: Rikiya Mizuta, Odawara (JP); Koji Nagata, Kaisei (JP); Masaaki Kobayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 727 days.

(21) Appl. No.: 12/007,529

(22) Filed: Jan. 11, 2008

(65) Prior Publication Data

US 2009/0006794 A1 Jan. 1, 2009

(30) Foreign Application Priority Data

Jun. 27, 2007 (JP) .................................. 2007-169622

(51) Int. Cl.
*G06F 12/00* (2006.01)
(52) U.S. Cl. .. 711/162; 711/161; 711/114; 711/E12.001
(58) Field of Classification Search .................. 711/162, 711/114, E12.001, 161
See application file for complete search history.

(56) References Cited

U.S. PATENT DOCUMENTS

| 5,870,537 A | 2/1999 | Kern et al. |
| 2005/0038968 A1* | 2/2005 | Iwamura et al. ............... 711/162 |
| 2006/0236048 A1* | 10/2006 | Deguchi et al. ............... 711/162 |
| 2007/0038824 A1* | 2/2007 | Suishu et al. ................. 711/162 |

FOREIGN PATENT DOCUMENTS

| EP | 1 785 868 A2 | 3/2004 |
| EP | 1 785 868 A3 | 3/2004 |
| JP | 2005-293469 | 4/2004 |

* cited by examiner

*Primary Examiner* — Mardochee Chery
(74) *Attorney, Agent, or Firm* — Volpe and Koenig, P.C.

(57) ABSTRACT

Provided is a control method for an asynchronous remote copy system, the method including: fixing data in a secondary volume; determining a certain area in the secondary volume that contains data required to be copied to a primary volume from the secondary volume in which the data is fixed; copying the data in the certain area to the primary volume; and swapping the primary volume and the secondary volume for restarting the asynchronous remote copy.

10 Claims, 18 Drawing Sheets

- BITMAP CONTROL PROGRAM — 200
- REMOTE-COPY EXECUTION PROGRAM — 210
- CONTROL PROGRAM — 220
- VOLUME MANAGEMENT TABLE — 230

(36)

230

VOLUME MANAGEMENT TABLE

| VOL-ID | PATH INFORMATION | VOL INFORMATION | POOL VOL FLAG | PAIR INFORMATION |
|--------|------------------|-----------------|---------------|------------------|
| 1 | ... | PRIMARY VOL | 0 | ... |
| 2 | - | - | 1 | ... |
| 3 | - | - | 1 | ... |
| 4 | - | - | 1 | ... |
| ⋮ | ⋮ | ⋮ | ⋮ | ⋮ |

ASYNCHRONOUS REMOTE COPY SYSTEM AND CONTROL METHOD FOR THE SAME

CROSS-REFERENCES TO RELATED APPLICATIONS

This application relates to and claims priority from Japanese Patent Application No. JP2007-169622, filed on Jun. 27, 2007, the entire disclosure of which is incorporated herein by reference.

BACKGROUND

1. Field of the Invention

The invention relates generally to a remote copy system using a storage system, and especially to an asynchronous remote copy system having a function for swapping the roles of a main site and a remote site between a first storage system and a second storage system included in the remote copy system. In the description below, this function will be sometimes referred to as a swap function.

2. Description of Related Art

In database systems handling a large amount of data, such as those used in a data center, data is often managed using a storage system that is provided separately from a host system. A disk array system is a well known example of such a storage system.

The disk array system manages a lot of disk drives arranged in an array via RAID (Redundant Array of Inexpensive Disks) management. Many disk drives provide a physical storage area, and at least one logical unit is formed in the physical storage area. This logical unit is provided to a host system. The host system recognizes the logical unit as one physical device and data-accesses the logical unit.

In such a storage system, measures are taken for securely protecting data in case of disasters or similar. For example, JP2005-293469 A discloses a system capable of enhancing fault tolerance by remote-copying data written to a copy-source volume in a primary storage control apparatus located at a main site to a copy-destination volume in a secondary storage control apparatus located at a remote site, so as to realize data duplication.

Such remote copying includes two types: synchronous remote copy, which synchronously processes host IO from a host in the main site to the primary storage control apparatus and remote copy IO from the primary storage control apparatus to the secondary storage control apparatus; and asynchronous remote copy, which asynchronously processes the host IO and the remote copy IO.

In the asynchronous remote copy, the primary storage control apparatus fixes difference data in the copy-source volume on a predetermined cycle (e.g., every five minutes), and transfers the difference data to the copy-destination volume in the secondary storage control apparatus once every cycle. In the description below, in some situations, the copy-source volume will be referred to as a primary volume and the copy-destination volume will be referred to as a secondary volume.

A system that executes the synchronous remote copy synchronously double-writes write data from the host to the primary volume and to the secondary volume. Accordingly, when the swap function is requested by a user, the swap function can be realized by promoting the secondary volume at the remote site to a primary volume while changing the primary volume at the main site to a secondary volume to swap the roles of the remote site and the main site.

On the other hand, in a related art asynchronous remote copy system that does not have such a swap function, data update in the primary volume at the main site is reflected in the secondary volume several minutes or several tens of minutes later. Due to this arrangement, the secondary volume is in an unfixed state while the asynchronous remote copy is being executed, so the secondary volume cannot be promoted as is to the primary volume when a command for executing the swap function is issued to the remote copy system.

In order to realize the swap function in the asynchronous remote copy system, the data image of the secondary volume has to be restored to its status before the current asynchronous remote copy cycle, and the primary volume at the main site has to be matched with the secondary volume at the remote site; in short, both of the volumes have to be temporarily synchronized to realize the swap function.

Here, when copying all data in the secondary volume to the primary volume, it will take a long time to complete the copy, and in addition, a large communication load will be applied to the communication line connecting the main site and the remote site to each other.

SUMMARY

In order to solve the problem above, it is an object of the present invention to provide an asynchronous remote copy system and control method capable of realizing a swap function in a short period of time even if asynchronous remote copy is executed between a primary volume and a secondary volume.

In order to achieve this object, according to an aspect of this invention, a swap function can be realized in an asynchronous remote copy system without copying all data in a primary volume to a secondary volume, by fixing data in the secondary volume during a cycle of the asynchronous remote copy and determining the area in the secondary volume that contains data that needs to be copied from the secondary volume to the primary volume.

With this aspect of the invention, an asynchronous remote copy system and control method capable of realizing a swap function in a short period of time can be provided.

DETAILED DESCRIPTION OF PREFERRED EMBODIMENTS

Figure 1:
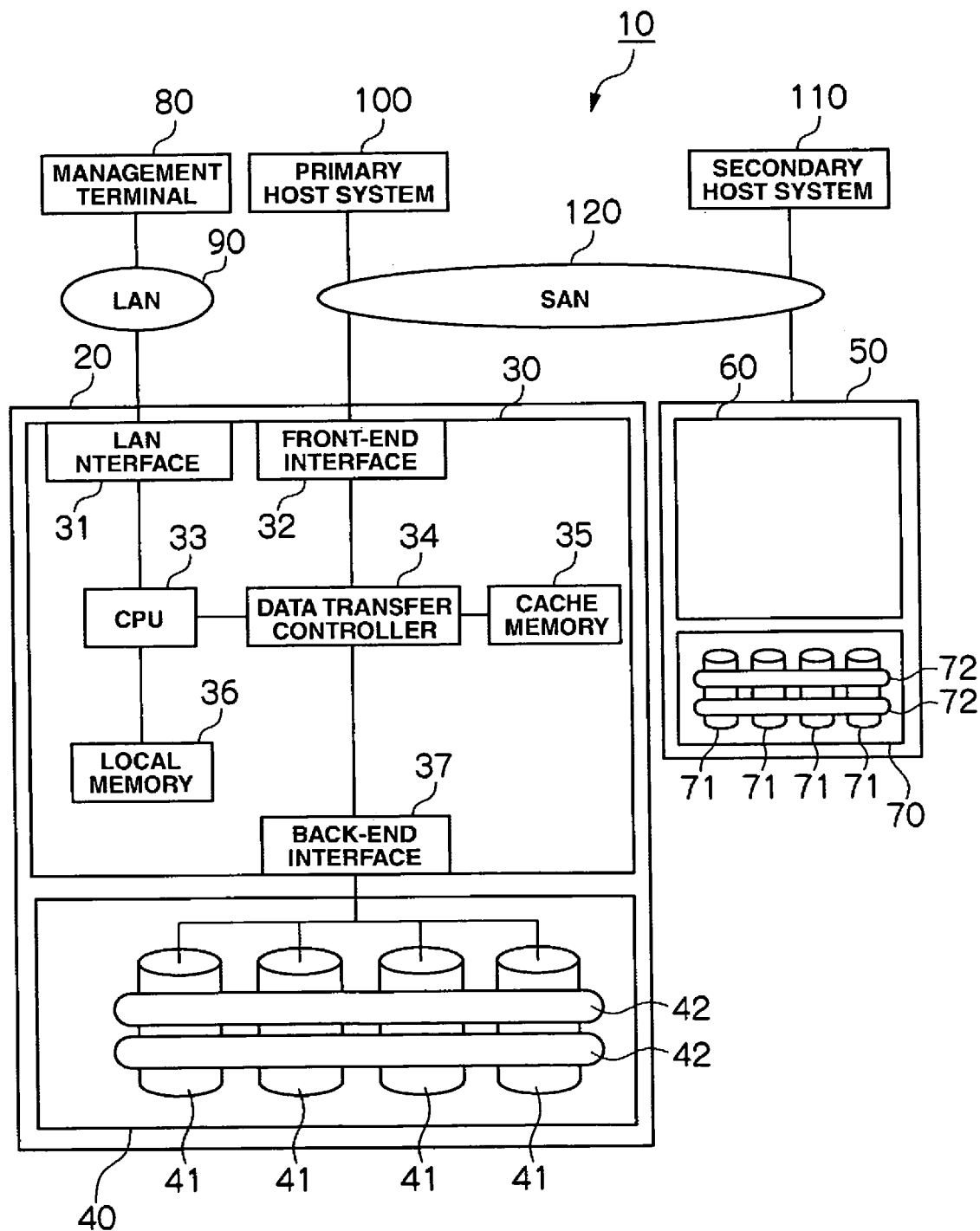
FIG. 1 is a hardware block diagram of a storage system showing an embodiment of asynchronous remote copy according to this invention.

An embodiment of this invention will be described with reference to the attached drawings. FIG. 1 shows the system configuration of a storage system 10 that realizes an asynchronous remote copy system according to this invention. The storage system 10 includes a primary storage control apparatus 20 installed at a main site and a secondary storage control apparatus 50 installed at a remote site. The primary control apparatus 20, the secondary control apparatus 50, a primary host system 100 and a secondary host system 110 are connected to each other via a SAN (Storage Area Network) 120.

The primary host system 100 is a regularly-operating host system, which requests the primary storage control apparatus 20 I/O processing mainly when the primary host system is in a normal condition. On the other hand, the secondary host system 110 is a standby host system, which requests the secondary storage apparatus 50 I/O processing mainly when a failures occurs in the regularly-operating primary host system 100 and takes over the processing that is being executed by the primary host system 100. The primary host system 100 and the secondary host system 110 may each be a personal computer, a work station, or a mainframe computer or the like. A program called a RAID manager is resident in the primary host system 100 for controlling the primary storage control apparatus 20. Similarly, a RAID manager is resident in the secondary host system 110 for controlling the secondary storage control apparatus 50.

The storage system 10 is arranged so that data written to the primary storage control apparatus 20 is remote-copied to the secondary storage control apparatus 50. The secondary storage control apparatus 50 stores the same data image as the data image the primary storage control apparatus 20 has stored in the past. With that arrangement, even when a failure occurs in the primary storage control apparatus 20, the processing of the primary storage control apparatus 20 can be taken over by the secondary storage control apparatus 50.

The remote copy method employed herein is asynchronous remote copy, where when data is written to the primary storage control apparatus 20, the primary storage control apparatus 20 reports to the primary host system 100 completion of the writing, and data is transferred from the primary storage control apparatus 20 to the secondary storage control apparatus 50 once every predetermined time cycle.

The primary storage control apparatus 20 includes a controller 30 and a memory apparatus 40 as main components. The controller 30 includes a LAN (Local Area Network) interface 31, a front-end interface 32, a CPU 33, a data transfer controller 34, a cache memory 35, a local memory 36 and a back-end interface 37.

A controller 30 can control a plurality of disk drives 41 using a RAID level (e.g., 0, 1, 5) specified in a so-called RAID system. In the RAID system, a plurality of disk drives 41 is managed as one RAID group. A plurality of logical volumes 42, each being an access unit accessed by the primary host system 100, is defined in the RAID group. Each of the logical volumes 42 is assigned a LUN (Logical Unit Number).

The CPU 33 is a processor for controlling I/O processing (i.e., write access and read access) involving the plurality of disk drives 41 in response to data input/output requests from the primary host system 100.

The local memory 36 stores various types of microprograms, a volume management table and the like. The various types of microprograms and the volume management table will be described later in detail.

The cache memory 35 is a buffer memory for temporarily storing write data to be written to the disk drives 41 or read data read out from the disk drives 41. The cache memory 35 is provided with a power backup in case of a power failure and is configured as a nonvolatile memory that can prevent cache data from being lost, even when a power failure occurs in the primary storage control apparatus 20.

The data transfer controller 34 connects the cache memory 35, the front-end interface 32, the back-end interface 37 and the CPU 33 with one another and controls data transfer between the primary host system 100 and the disk drives 41. When write access is requested by the primary host system 100, the data transfer controller 34 writes data received from the primary host system 100 to the cache memory 35 via the front-end interface 32. Then the data transfer controller 34 transfers the write data to the back-end interface 37 in order to asynchronously write the write data to the disk drives 41. When read access is requested by the primary host system 100, the data transfer controller 34 writes read data read out from the disk drives 41 to the cache memory 35 via the back-end interface 37, and transfers the read data to the front-end interface 32.

The front-end interface 32 is a controller for controlling an interface between the primary host system 100 and the primary storage control apparatus 30. For example, the front-end interface 32 has a function for receiving block access requests from the primary host system 100 based on fibre channel protocol.

The back-end interface 37 is a controller for controlling an interface between the disk drives 41 and the primary storage control apparatus 30. For example, the back-end interface 37 has a function for controlling data input/output requests to the disk drives 41 based on a protocol for controlling the disk drives 41.

The LAN interface 31 is an interface connected to a LAN 90. The LAN interface 31 controls the transfer/receipt of data and control signals between a management terminal 80 and the primary storage control apparatus 30 based on TCP/IP.

The memory apparatus 40 includes the plurality of disk drives 41. The disk drive 41 is a storage device such as an FC (Fibre Channel) disk drive, a SATA (Serial Advanced Technology Attachment) disk drive, a PATA (Parallel Advanced Technology Attachment) disk drive, a FATA (Fibre Attached Technology Adapted) disk drive, a SAS (Serial Attached SCSI) disk drive and a SCSI (Small Computer System Interface) disk drive.

The primary storage control apparatus 20 is connected to the management terminal 80 via the LAN 90. The management terminal 80 is a computer system having hardware resources such as a CPU, a memory and a display. Through an input operation on the management terminal 80, a system administrator transmits a command for managing the primary storage control apparatus 20 to the primary storage control apparatus 20. Examples of the command for managing the primary storage control apparatus 20 include a command for adding or reducing disk drives 41, a command for changing the RAID configuration, a command for setting a communication path between the host system 100 and the primary storage control apparatus 20, a command for the CPU 33 to install a microprogram in the local memory 36, a command for checking the operation status of the primary storage control apparatus 20, and a command for identifying a failure position in the primary storage control apparatus 20.

The secondary storage control apparatus 50 includes a controller 60 and a memory apparatus 70, like the primary storage control apparatus 20. The controller 60 can control a plurality of disk drives 71 using a RAID level (e.g., 0, 1, 5) specified in a so-called RAID system. In the RAID system, a plurality of disk drives 71 is managed as one RAID group.

A plurality of logical volumes 72, each being an access unit accessed by the secondary host system 110 is defined in the RAID group. Each of the logical volumes 72 is assigned with a LUN (Logical Unit Number). The logical volume is a logical storage area. The hardware configurations of the controller 60 and the memory apparatus 70 are the same as those in the primary storage control apparatus 20.

Figures 2, 3:
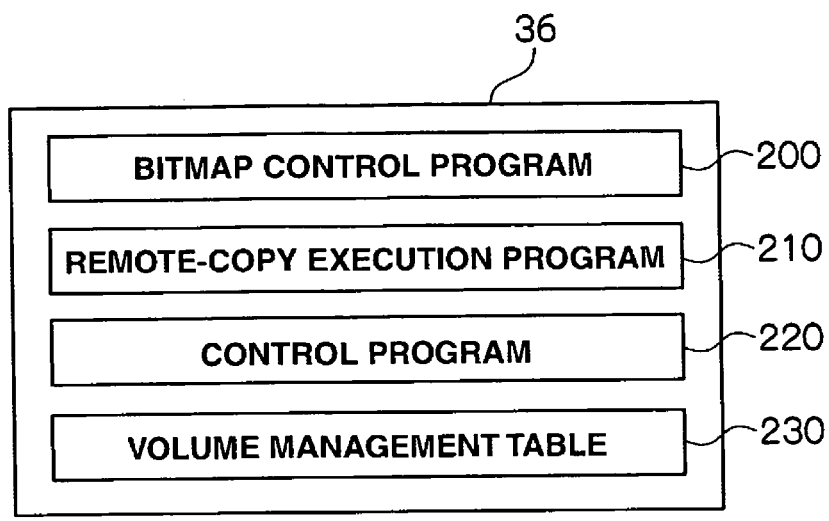
FIG. 2 is a diagram illustrating various microprograms and a volume management table.
FIG. 3 is a diagram illustrating the volume management table.

FIG. 2 shows various microprograms and a volume management table stored in the local memories 36 of the primary storage control apparatus 20 and the secondary storage control apparatus 50. The local memories 36 each store a bitmap control program 200, a remote-copy execution program 210, a control program 220 and a volume management table 230.

The bitmap control program 200 executes a control processing for a later-described bitmap. The remote-copy execution program 210 executes remote copy. The control program 220 controls the bitmap control program 200 and the remote-copy execution program 210. The volume control table 230 stores information about a plurality of logical volumes 42 (72).

FIG. 3 shows the table structure of the volume management table 230. The volume management table 230 stores, for each of the plurality of logical volumes, a VOL-ID for identifying a logical volume (hereinafter abbreviated as "VOL" in some situations), path information showing an access path for the logical volume, the type of the logical volume, a flag showing whether the logical volume is a pool volume or not, and information about a volume pair containing the logical volume (hereinafter referred to as "pair information"), all of which are associated with each other.

The information stored in the volume management table 230 is input, for each of the primary storage control apparatus 20 and the secondary storage control apparatus 50, through the management terminal 80 or each host system. Here, the arrangement may be the one where another management terminal 80 dedicated to the secondary storage control apparatus 50 is provided, or the one where the management terminal 80 for the primary storage control apparatus 20 controls the secondary storage control apparatus 50.

Examples of the volume type include "primary," "secondary" and "pool.". The "primary" volume is provided in the primary storage control apparatus 20 and serves as copy-source in the remote-copy processing.

The "secondary" volume is provided in the secondary storage control apparatus 50 and serves as a copy destination in the remote-copy processing. When the primary and secondary storage control apparatus roles are swapped, the primary and secondary volume roles are also swapped.

The pool volume is a volume whose path information is undefined. A pool volume flag indicates whether or not the relevant logical volume is a pool volume. Specifically, a pool volume flag of "1" indicates that the relevant logical volume is a pool volume, while a pool volume flag of "0" indicates that the relevant logical volume is not a pool volume.

The pair information includes, for example, pair partner information and a pair status. For example, the pair partner information includes, as information about a logical volume to be a pair partner (hereinafter, referred to as a pair-partner VOL), the ID of the storage control apparatus that includes the pair-partner VOL, a VOL-ID of the pair-partner VOL, and path information and the like. The pair statuses include "SMPL," "COPY," "PAIR," "PSUE," "SPLIT," "SSWS," etc.

"SMPL" indicates the status before a pair is made, where there is no primary-secondary relationship. "COPY" indicates the status during formation copy, where data in the primary volume is copied to the secondary volume. When the status is "COPY," write processing to the secondary volume is not permitted. "PAIR" indicates the status in which asynchronous copy from the primary volume to the secondary volume is being executed. During "PAIR" status, write processing to the secondary volume is not permitted.

"PSUE" indicates the status in which asynchronous copy from the primary volume to the secondary volume is stopped. During "PSUE" status, write and read processing to the secondary volume is not permitted. Although write processing to the primary volume can be conducted, data transfer to the secondary volume is not permitted during "PSUE" status.

"SPLIT" is the status where the primary volume and the secondary volume are logically divided and only difference data from before and after update of the primary volume is copied to the secondary volume. "SSWS" indicates the status in which read and write processing to the secondary volume are permitted. When the status is "SSWS," data in the secondary volume is restored to the latest fixed state, and the primary volume is shifted to "PSUE" status.

The CPU 33 can identify the logical volume 42 type of the access target and the pair information by referring to the volume management table 230. In addition, if a pool volume is allocated to a later-described virtual volume, the CPU 33 can define information showing a path to this pool volume and enter the defined path information in the volume management table 230. The CPU 33 can also delete path information about a non-allocated pool volume in order to set this pool volume as unused. The CPU 33 can judge whether each pool volume's status is used or unused by checking whether or not the path information for each pool volume has been entered.

Figure 4:
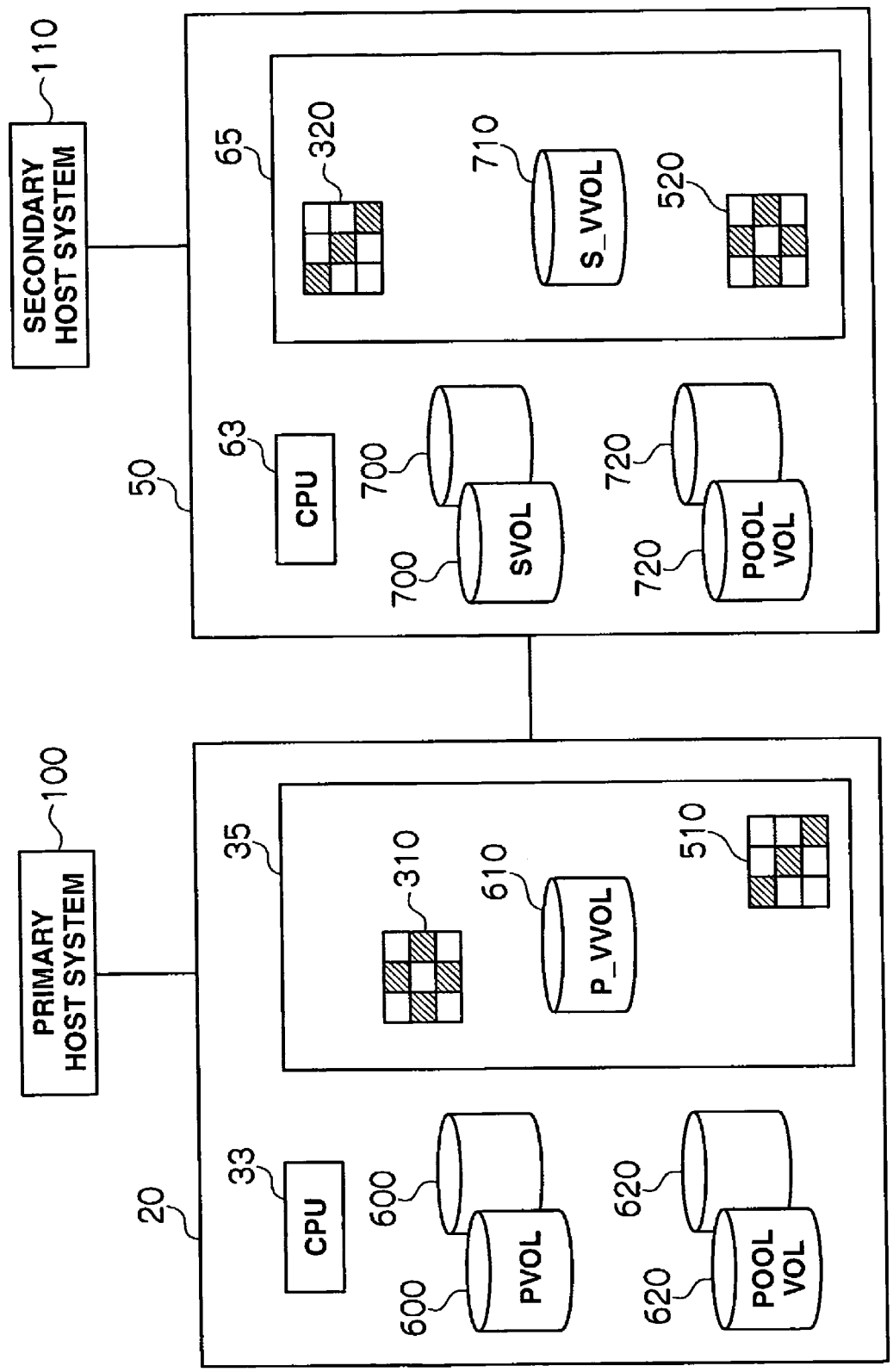
FIG. 4 is a block diagram showing a hardware configuration for realizing a swap function in the asynchronous remote copy.

FIG. 4 shows the outline of an asynchronous remote copy processing executed by the primary storage control apparatus 20. The primary storage control apparatus 20 includes the CPU 33, the cache memory 35, primary volumes (P-VOL)

600, a virtual volume (P_VVOL) 610, a plurality of pool volumes 620, an internal snapshot bitmap 310 and a transfer-difference bitmap 510. The internal snapshot bitmap 310 and the transfer-difference bitmap 510 are control information for the primary volume 600 and the pool volume 620 and are stored in the local memory 36.

The pool volume 620 is a logical volume that saves pre-update data when the primary host system 100 issues a write IO to the primary volume 600 during asynchronous remote copy.

The virtual volume 610 is a virtual logical volume that is used by the CPU 33 in the primary storage control apparatus 20 to asynchronously remote-copy difference data from the primary volume 600 to a secondary volume (S-VOL) 700.

In the asynchronous remote copy system, a cycle for data copy from a main site to a remote site is defined by its start and end, and the cycle is repeated asynchronously with a write IO from the primary host system to the primary volume. During the current cycle where the asynchronous remote copy is being executed, difference data in the primary volume fixed at the end of the last cycle is transferred to the secondary volume.

This remote copy system is so arranged that pluralities of primary volumes 600 and secondary volumes 700 are provided, a plurality of pairs each including one primary volume and one secondary volume is made, and remote copy can be conducted between each of the plurality of pairs. The plurality of pairs defines a common consistency group. The consistency group means that the time sequence for data update is ensured between the plurality of pairs.

Although FIG. 4 shows an example where the virtual volume 610 is formed in a storage area of the cache memory 35, the virtual volume 610 may be formed in a storage area of a disk drive 41.

If there is a plurality of pairs each including one primary volume 600 and one secondary volume 700, a pool volume 620 is allocated to each pair. In addition, if there is a plurality of such asynchronous remote copy pairs, there is also a plurality of virtual volumes 610, and a virtual volume 610 is allocated to each pair. Also, one primary volume 600 and one pool volume 620 are allocated to the virtual volume, and data is transferred from the primary volume 600 or the pool volume 620 to the secondary volume 700 via the virtual volume 610. Incidentally, in an arrangement where a plurality of pool volumes 620 and a plurality of pairs each including a primary volume 600 and a secondary volume 700 are provided, a pool volume 620 may be allocated to each pair.

A bitmap 310 is set in the cache memory 35 of the primary storage control apparatus 20, the bitmap 310 managing a primary volume 600 storage area in which data has been updated based on a write IO from the primary host system 100. Each bit in the bitmap corresponds to each block in the primary volume 600 and in the secondary volume 700. The same applies to the later-described transfer-difference bitmap 510. A block is an area defined by a logical address.

Accordingly, by referring to the bitmap 310, the CPU 33 can judge that data has been updated based on an IO from the primary host system 100 in the primary volume block that corresponds to a bit for which a flag has been set. In order to distinguish this bit map from the later-describe transfer-difference bit map 510, this bitmap will be referred to as an internal snapshot bitmap.

The transfer-difference bitmap 510 is control information for managing the location of difference data to be transferred from the primary volume 600 to the secondary volume 700. The CPU 33 refers to the transfer-difference bitmap 510, reads out difference data from the primary volume 600 or the pool volume 620 and transfers the read difference data to the secondary volume 700.

The secondary storage control apparatus 50 serves as a stand-by system in combination with the secondary host system 110, and thus has an arrangement similar to that of the primary storage control apparatus 20. The reference numeral 63 denotes a CPU corresponding to the CPU 33 in the primary storage control apparatus 20; 700 denotes the secondary volume as already described; 720 denotes a pool volume corresponding to the pool volume 620, 65 denotes a cache memory corresponding to the cache memory 35; 320 denotes an internal snapshot bitmap corresponding to the internal snapshot bitmap 310; 710 denotes a virtual volume corresponding to the virtual volume 610; and 520 denotes a transfer-difference bitmap corresponding to the transfer-difference bitmap 510.

Next, an operation for realizing the swap function in the asynchronous remote copy system in FIG. 4 will be described. In order for the storage system to realize the swap function during an asynchronous remote copy cycle, the primary volume 600 and the secondary volume 700 have to be synchronized, i.e., data in the secondary volume 700 and data in the primary volume 600 have to be matched with each other.

For this purpose, by first fixing data in the secondary volume 700 and then copying only required portion(s) from the secondary volume 700 to the primary volume 600, the processing for realizing the swap function can be performed in a short period of time.

In order to fix the data in the secondary volume, the secondary volume 700 is put into the status where the secondary volume 700 holds data from when the last asynchronous remote copy cycle terminated and, in addition to this data, data written by the secondary system 110 to the secondary volume 700 after the operation of the primary host system 100 is taken over by the secondary host system 110.

Then, in order to copy only the required portion(s) in the secondary volume 700 to the primary volume 600, the area(s) required to be copied in the secondary volume 700 is determined. These areas in the secondary volume include: the area to which difference data in the primary volume 600 has been written during the asynchronous remote copy current cycle; the area to which the primary volume 600 difference data should be written; the area to which data is written by the secondary host system 110 after the operation of the primary system 110 is taken over by the secondary system 110; and the area corresponding to the area in the primary volume 600 to which data was written by the primary host 100 after the current asynchronous processing cycle started and until the operation of the primary system 100 was taken over by the secondary host system 110.

Next, the asynchronous remote copy will be described in more detail. FIGS. 5 to 16 are block diagrams showing an asynchronous remote copy processing sequence. In theses drawings, the hardware structure in FIG. 4 is shown in a simple manner. It should be noted that, in the below description, the CPU, 33 in the primary storage control apparatus 20 will be referred to as a primary CPU 33, while the CPU 63 in the secondary storage control apparatus 50 will be referred to as a secondary CPU 63.

The primary CPU 33 fixes difference data in the primary volume 600 resulting from a write command from the host system 100 every asynchronous remote copy cycle, and transfers the fixed difference data to the secondary storage control apparatus 50 in the next asynchronous remote copy cycle.

Figure 16A:
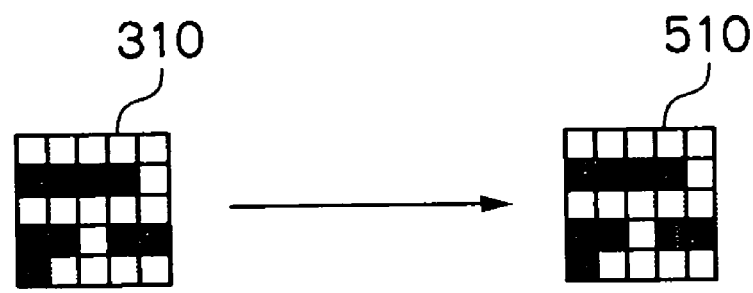
FIGS. 16A and 16B are block diagrams each showing an example of how a CPU controls an internal snapshot bitmap and a transfer-difference bitmap in a storage control apparatus at a main site.
Figure 16B:

As shown in FIG. 16A, the primary CPU 33 copies the entire image of the internal snapshot bitmap 310 for the point in time when the asynchronous remote copy terminated to the transfer-difference bitmap 510. At the same time, as shown in FIG. 16B, the primary CPU 33 clears all bits in the internal snapshot bitmap 310. At this point in time, the primary volume 600 difference data, which is to be transferred from the primary volume 600 to the secondary volume 700, is fixed.

Figure 5:
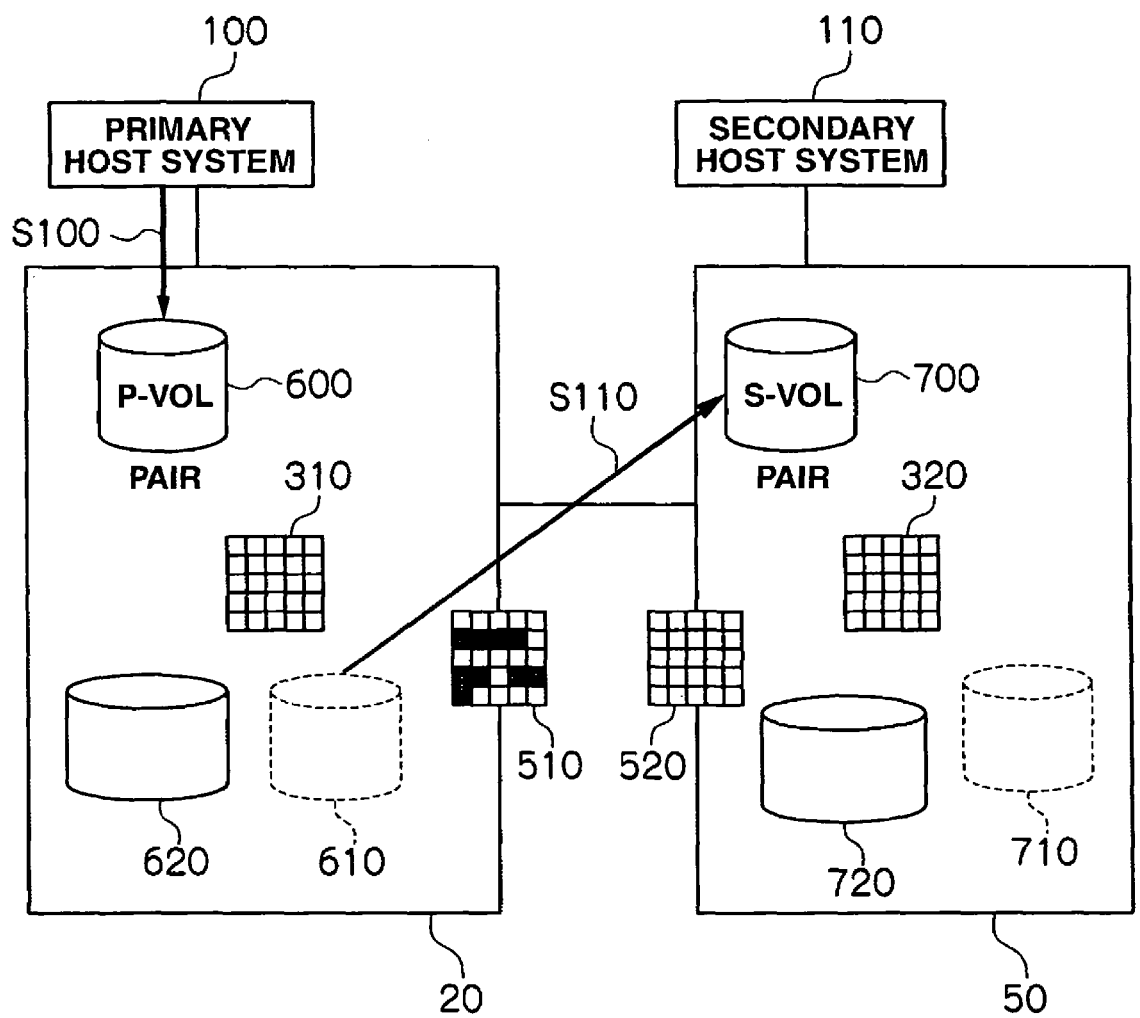
FIG. 5 is a block diagram showing a first step for realizing the swap function in the asynchronous remote copy.
Figure 6:
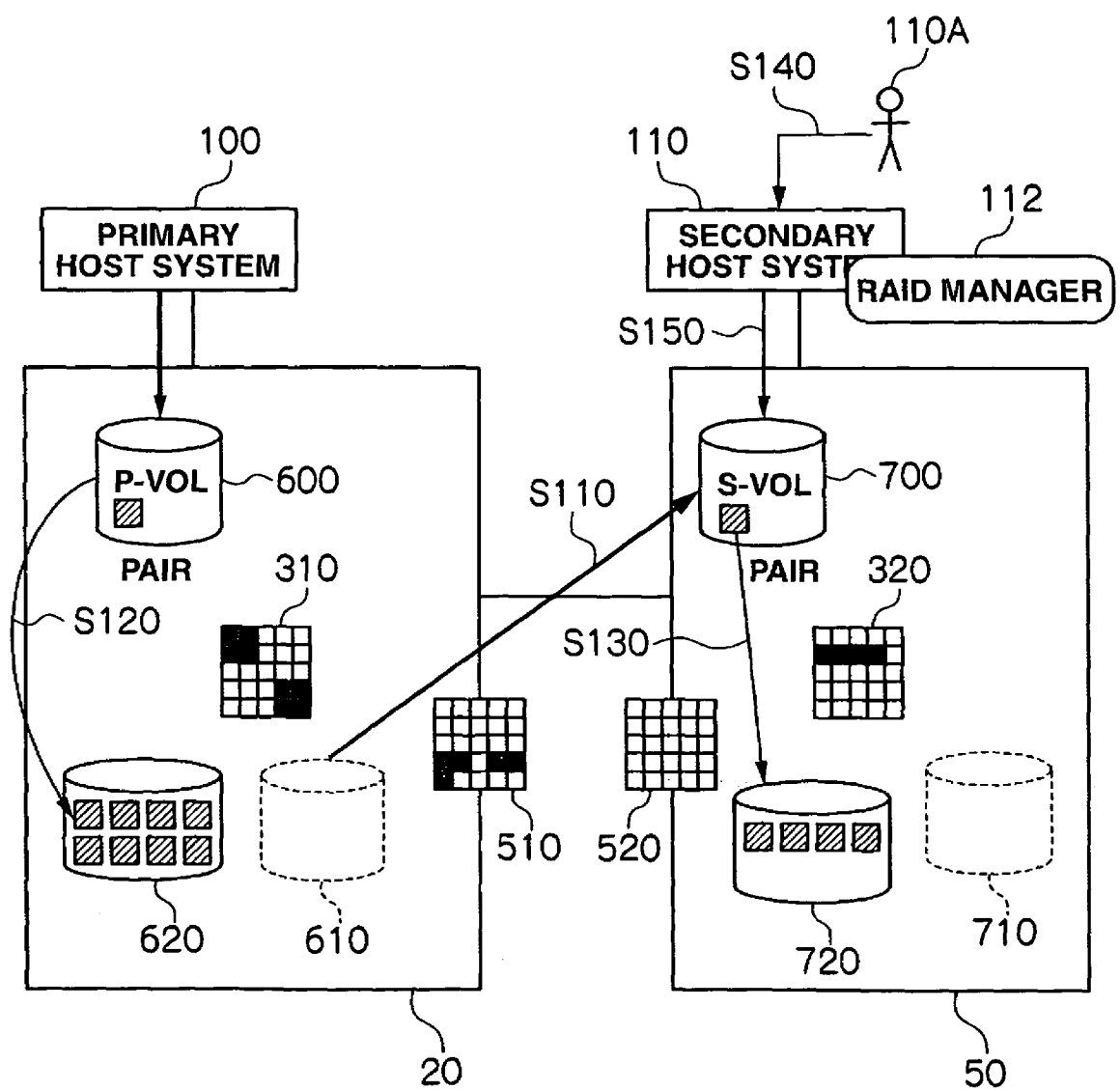
FIG. 6 is a block diagram showing a successive step for realizing the swap function in the asynchronous remote copy.

FIG. 5 shows the statuses of the volumes and bitmaps in the primary storage control apparatus 20 and the secondary storage control apparatus 50 when the current asynchronous remote copy cycle is started. When a write command S100 is issued by the primary host system 100 to the primary volume 600 in the middle of asynchronous remote copy, the primary CPU 33 sets a flag in the internal snapshot bitmap 310 for a block to which write data has been written, as shown in FIG. 6. The internal snapshot bitmap having 5 bits×5 bits is shown as an example, where each bit corresponds to each block in the volume. The black-colored bits show that flags have been set in these bits. The same applies in other bitmaps.

A primary volume 600 and a secondary volume 700 are set to the earlier-described "PAIR" status, and the difference data is sequentially transferred to the secondary volume 700 (S100). When the host system 100 write-accesses the primary volume 600, the primary CPU 33 saves pre-update data in the primary volume 600 for each block of the primary volume 600 (S120) in a pool volume 620. The pre-update data is saved in the pool volume 620 because this pre-update data might be the difference data to be transferred to the secondary volume 700.

Further description will be given referring to FIG. 6. The primary CPU 33 refers to the transfer-difference bitmap 510 and determines that the fixed difference data is allocated to a block in the virtual volume 610 corresponding to a bit for which a flag is set. The primary CPU 33 checks whether a flag is set for an internal snapshot bitmap 310 bit corresponding to that transfer-difference bitmap 510 bit for which the flag is set. If the flag is not set, the primary CPU 33 reads the difference data from the corresponding area in the primary volume 600 and assigns this difference data to the corresponding area in the virtual volume 610.

On the other hand, if the flag is set in the internal snapshot bitmap 310, the corresponding block in the primary volume 600 is updated by the write command S100 and the pre-update data (difference data) is saved in the pool volume 620, the difference data is read out from the corresponding area in the pool volume 620 and allocated to the corresponding area in the virtual volume 610.

The primary CPU 33 transfers the difference data allocated to the virtual volume 610 to the secondary volume 700 (S110). If the difference data is transferred to the secondary volume 700 based on the transfer-difference bitmap 510, the primary CPU 33 sequentially clears flags set in the blocks corresponding to the transferred difference data.

When writing the transferred difference data to the secondary volume 700, the secondary CPU 63 that has received the transferred difference data sets a flag for an internal snapshot bitmap 320 bit corresponding to an area to which the difference data is written in the secondary volume 700, and saves pre-update data in the secondary volume 700 in the pool volume 720 (S130).

When the standby system of the secondary host system 110 and the secondary storage control apparatus 50 are shifted to serve as an operating system in the middle of asynchronous remote copy due to an occurrence of failure in the primary host system 100, a user or an administrator 110A of the secondary host system 110 issues a "Horctakeover" command to the RAID manager 112 in the secondary host system 110 (S140). The RAID manager 112 in a host system is agent software that controls a storage control apparatus.

This command shifts the secondary host system 110 and the secondary storage control apparatus 50 to have them serve as the operating system, i.e., to the primary side. The secondary host system 110, receiving this command, issues a "S-VOL Takeover" command to the secondary CPU 63 so that it starts restoration (described later) for the secondary volume 700 (S150).

When the pair status of the secondary volume 700 is changed to "SSWS," the secondary CPU 63 bans data transfer-based writing to the secondary volume 700 caused by the data transfer. When the data transfer to the secondary volume 700 cannot be conducted owing to an error during the data transfer, the primary CPU 33 changes the pair status of the primary volume 600 to "PSUE" and interrupts the data transfer to the secondary volume 700. In other words, the remote copy is interrupted or stopped.

Figure 7:
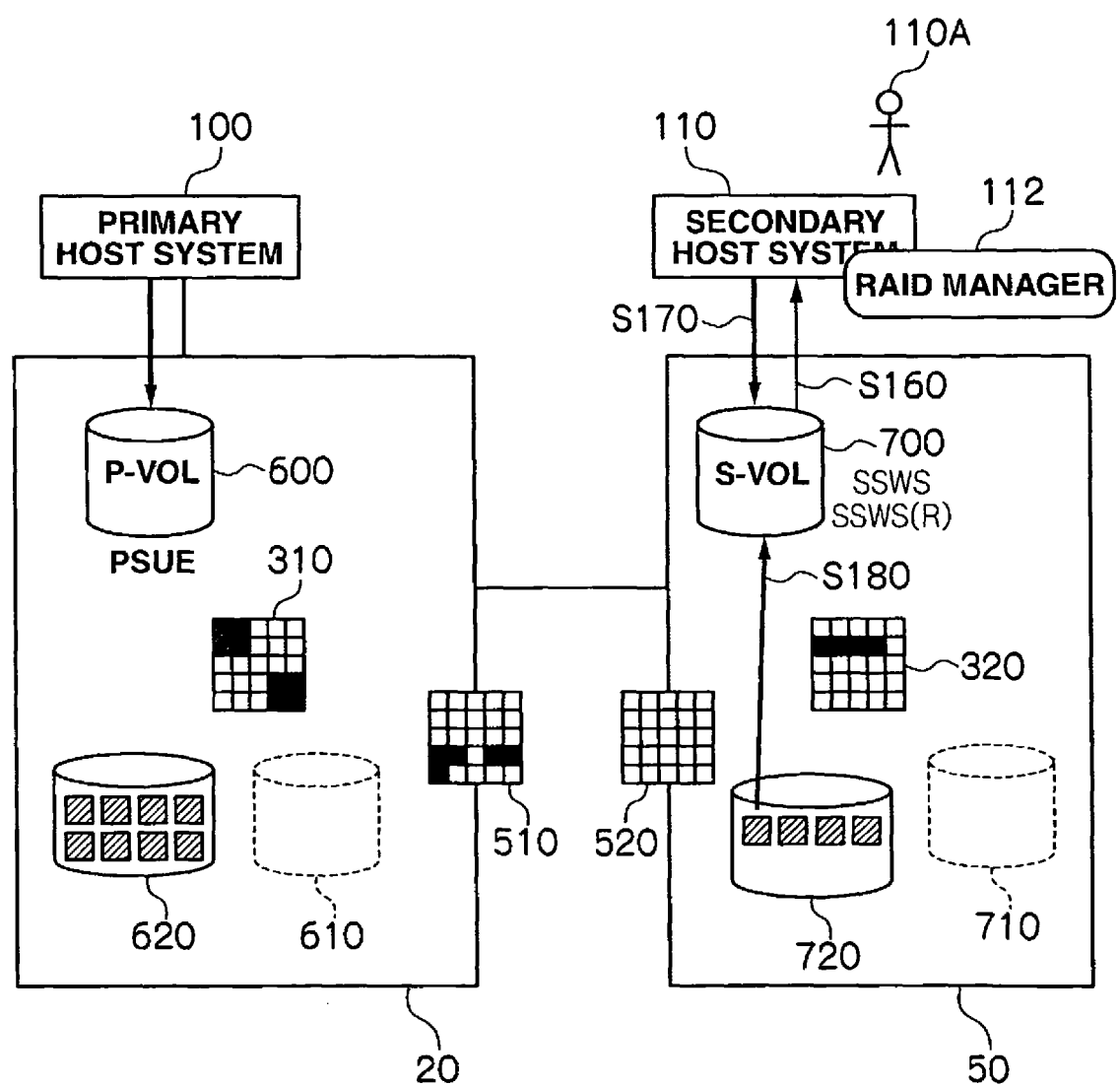
FIG. 7 is a block diagram showing a further successive step for realizing the swap function in the asynchronous remote copy.

As shown in FIG. 7, the secondary CPU 63, receiving a "S-VOL Takeover" command, gives a response to this "S-VOL Takeover" command (S160) to the RAID manager 112, and changes the pair status of the secondary volume 700 to "SSWS."

The secondary host system 110 takes over the operation of the primary host system 100 and starts issuing a write command to the secondary volume 700 (S170). The secondary CPU 63, receiving the write command, writes write data corresponding to this write command to the secondary volume 700.

The secondary CPU 63 writes the data that has been saved in the pool volume 720 to the secondary volume 700 in order to reproduce the data that has been fixed in the last asynchronous remote copy cycle in secondary volume 700 (S180). This processing sequence—the secondary CPU 63 writing the data that has been saved in the pool volume 720 to a certain area in the secondary volume 700 to restore the status of the secondary volume 700 to its status before update—is called restoration. By performing restoration, the secondary volume 700 is restored to the status that was fixed in the last asynchronous remote copy cycle, in other words, the secondary volume 700 is restored to its status before the current asynchronous remote copy cycle started, and the data in the secondary volume 700 can be fixed.

By referring to a flag in the internal snapshot bitmap 320, the secondary CPU 63 can learn which area in the secondary volume 700 the data saved in the pool volume 720 should be written to.

The reference numeral 520 in FIG. 7 denotes a transfer-difference bitmap in the secondary storage control apparatus 50. Like the transfer-difference bitmap 510 in the primary storage control apparatus 20, this transfer-difference bitmap 520 is used by the CPU to recognize, after the primary storage control apparatus 20 and the secondary storage control 50 apparatus are swapped and the asynchronous remote copy is restarted, the area in the volume 700, currently serving as a primary volume, that contains difference data to be transferred to the volume 600 currently serving as a secondary volume. During this process in which the primary storage control apparatus and the secondary storage control apparatus are being swapped, the transfer-difference bitmap 520 serves as an S-VOL (secondary volume) change bitmap for managing the location in the secondary volume containing data that should be transferred from the secondary volume to the primary volume.

In FIG. 7, when the secondary host system 110 issues a write command to the secondary volume 700 (S170), write data is written to the secondary volume 700. Then the secondary CPU 63 sets a flag in a S-VOL change bitmap 520 bit that corresponds to the block to which the write data has been written.

A user 110A can learn that the above-described restoration has started in the secondary storage control apparatus 50 from the response the secondary CPU 63 gives the RAID manager 112 as a response to the "S-VOL Takeover" command issued from the RAID manager 112.

During restoration, every time restoration of restoration target saved data is completed, the secondary CPU 63 copies the relevant flag in the internal snapshot bitmap 320 to the S-VOL change bitmap 520, and clears this flag from the internal snapshot bitmap 320. When all flags in the internal snapshot bitmap 320 are cleared, the secondary CPU 63 terminates the restoration. The reference numeral 520A shown in FIG. 8 denotes a flag set in the S-VOL change bitmap 520 and corresponding to a block for which restoration is complete, and the reference numeral 520B denotes a flag corresponding to a block to which data is written in the secondary volume 700 by the secondary host system 110 during the restoration. These will be described later in detail.

The secondary CPU 63 can identify a block that has been updated in the secondary volume 700 by referring to the S-VOL change bitmap 520. The secondary CPU 63 does not receive a command for cancelling the pair of the primary volume 600 and the secondary volume 700 while the restoration is being performed.

Although the description has been given with the pair status of the secondary volume being "SSWS," the pair status is stored in a table as "SSWS(R)" during restoration. The (R) shows that restoration is in progress. When restoration is complete, "SSWS(R)" is changed to "SSWS." By monitoring a management screen on a client computer or a management apparatus, a user can learn of the completion of restoration when the pair status of the secondary volume 700 is changed from "SSWS(R)" to "SSWS."

Figure 8:
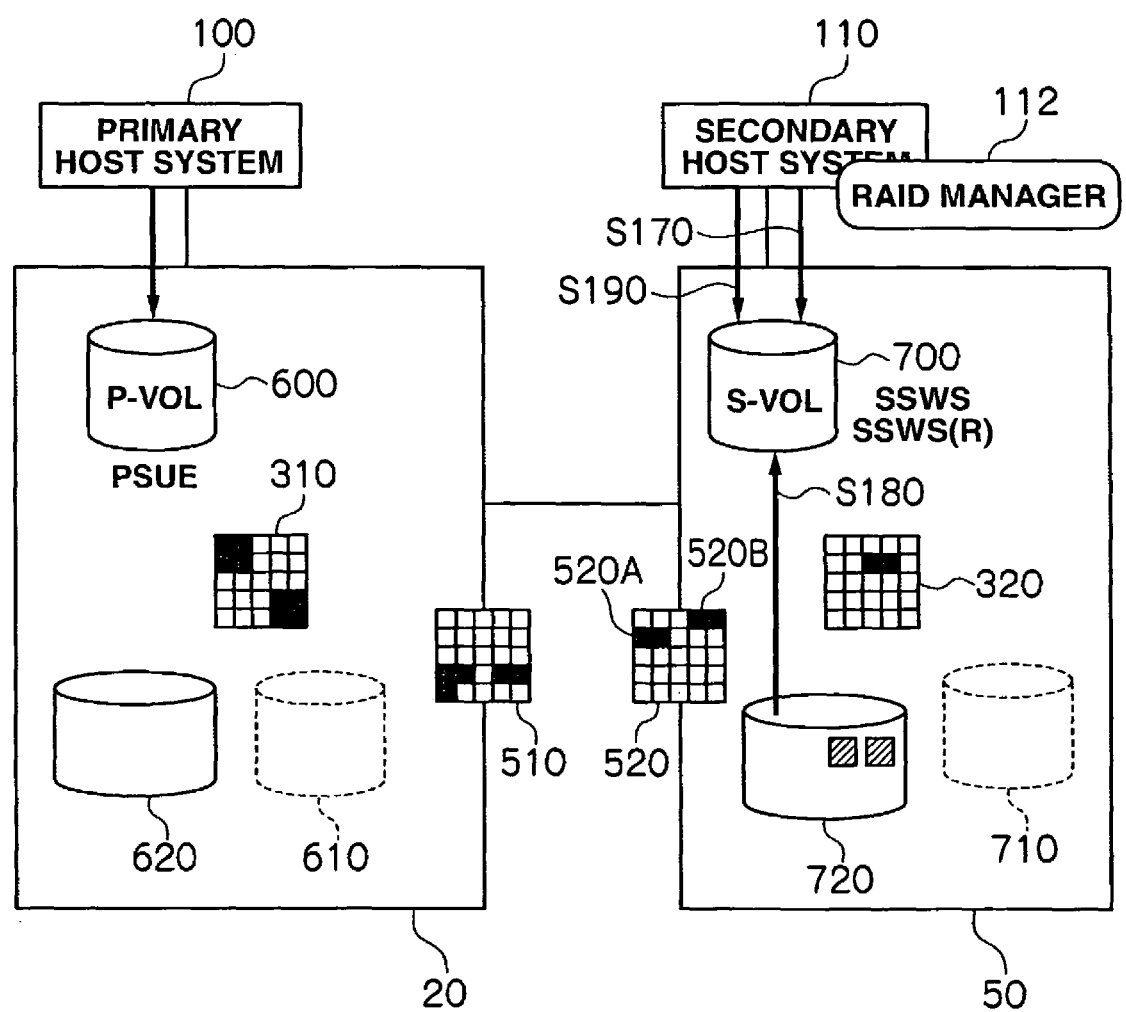
FIG. 8 is a block diagram showing a further successive step for realizing the swap function in the asynchronous remote copy.

As shown in FIG. 8, the RAID manager 112, receiving the response to the "S-VOL command," issues a "Swap Takeover" command for swapping the roles of the primary storage control apparatus 20 and the secondary storage control apparatus 50 to the secondary CPU 63 (S190).

Figure 9:
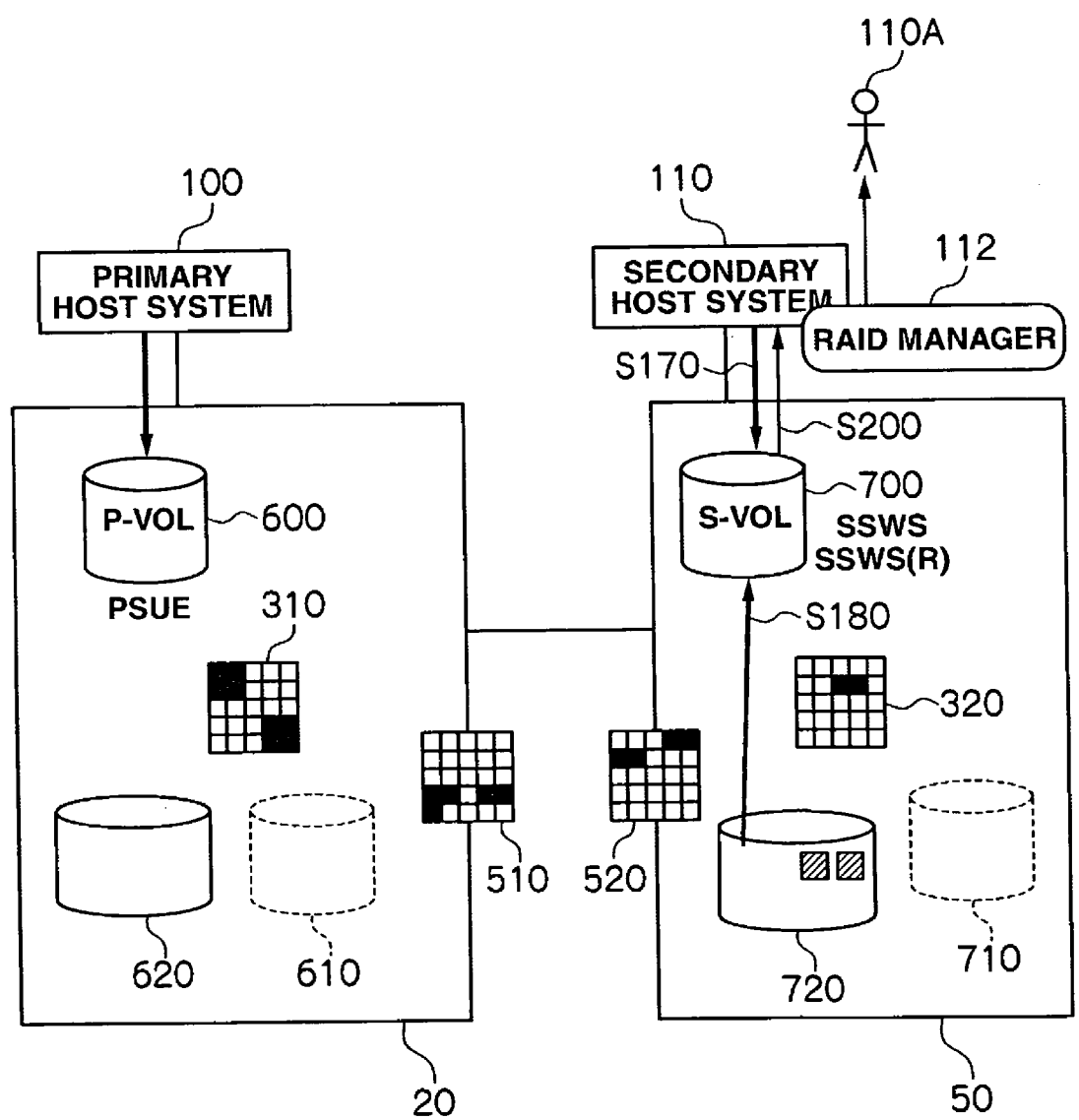
FIG. 9 is a block diagram showing a further successive step for realizing the swap function in the asynchronous remote copy.

When the secondary CPU 63, receiving this command, refers to the internal snapshot bitmap 320 and detects that a flag remains, it determines that the restoration is not complete and that the swapping of the roles of the primary and secondary cannot be performed, and gives an error response to the RAID manager 112 (S200, FIG. 9).

As shown in FIG. 9, the user 110A can learn, from the notification from the RAID manager 112, that the "S-VOL Takeover" command has started, i.e., the above-described restoration has started.

Figure 10:
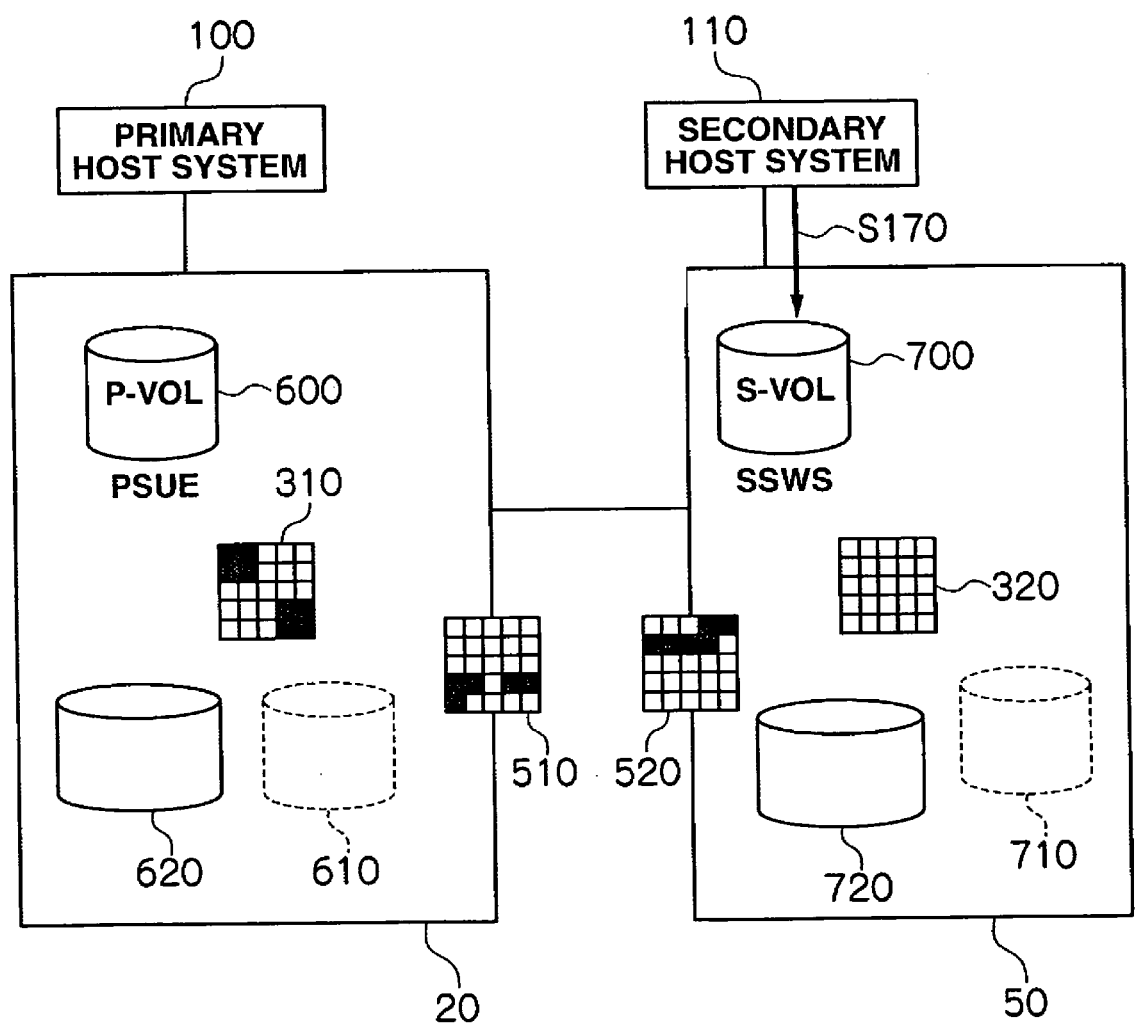
FIG. 10 is a block diagram showing a further successive step for realizing the swap function in the asynchronous remote copy.

As shown in FIG. 10, the CPU 63 repeatedly refers to the internal snapshot bitmap 320 until all the flags in the internal snapshot bitmap 320 are cleared, and determines that the restoration is complete when all the flags are cleared. The secondary CPU 63 changes the status of the secondary volume 700 from "SSWS(R)" to "SSWS" when the restoration is complete. From the display of the management screen, the user can learn that the status of the secondary volume 700 has changed from "SSWS(R)" to "SSWS."

Figure 11:
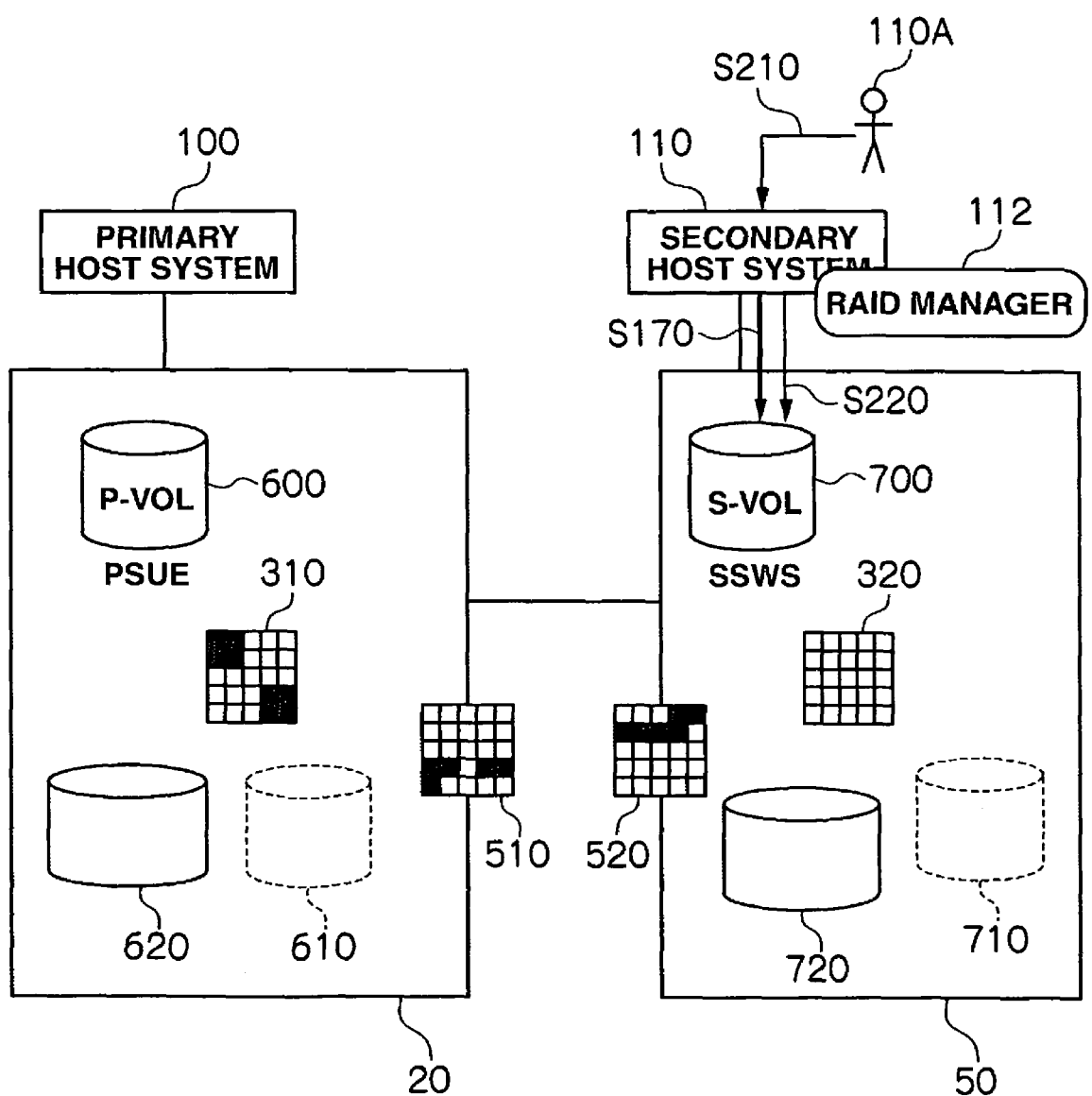
FIG. 11 is a block diagram showing a further successive step for realizing the swap function in the asynchronous remote copy.

As shown in FIG. 11, when the restoration is complete, the user 110A issues a "pairresync-swap" command S210 to the RAID manager 112. This command is a command for synchronizing the primary volume 600 with the secondary volume 700, i.e., for matching the data image in the secondary 700 volume with that in the primary volume 600.

Figure 12:
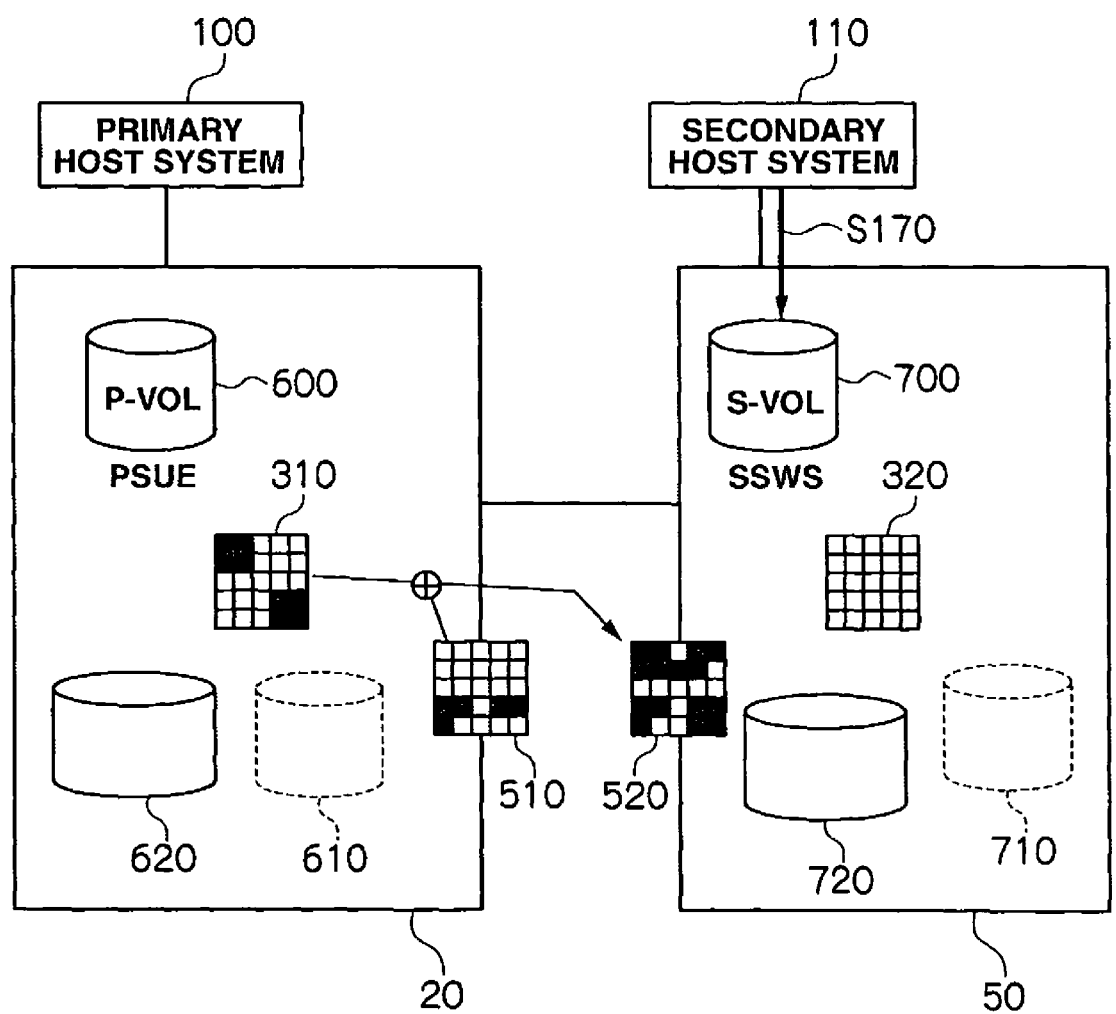
FIG. 12 is a block diagram showing a further successive step for realizing the swap function in the asynchronous remote copy.

As shown in FIG. 12, the RAID manager 112, receiving this command, re-issues a "Swap Takeover" command S220 to the secondary CPU 63. The secondary CPU 63, receiving this "Swap Takeover" command, obtains the bit patterns of the internal snapshot bitmap 310 and the transfer-difference bitmap 510 from the primary CPU 33, and merges these patterns into the S-VOL change bitmap 520.

Since an area in which a flag is set in the internal snapshot bitmap 310 is an area in which data in the primary volume 600 is updated by the primary host system 100 while difference data is being transferred by the primary CPU 33 to the secondary volume 700, the corresponding area in the secondary volume 700 has to be copied to the corresponding area in the primary volume 600 when the systems are swapped.

Also, an area in which a flag is set in the transfer-difference bitmap 510 indicates that the difference data has not yet been transferred to the secondary volume 700, so data has to be transferred from the corresponding area in the secondary volume 700 to the corresponding area in the primary volume 600.

As described above, the internal snapshot bitmap 310 bit pattern and the transfer-difference bitmap 510 bit pattern are merged into the S-VOL change bitmap 520. By referring to the S-VOL change bitmap 520 bit pattern, the secondary CPU 63 can recognize an area in the secondary volume 700 from which data should be transferred to the primary volume 600.

This merge can be realized by performing a logical OR operation on the flag data for all corresponding bits in the internal snapshot bitmap 310, the transfer-difference bitmap 510 and the S-VOL change bitmap 520.

Figure 13:
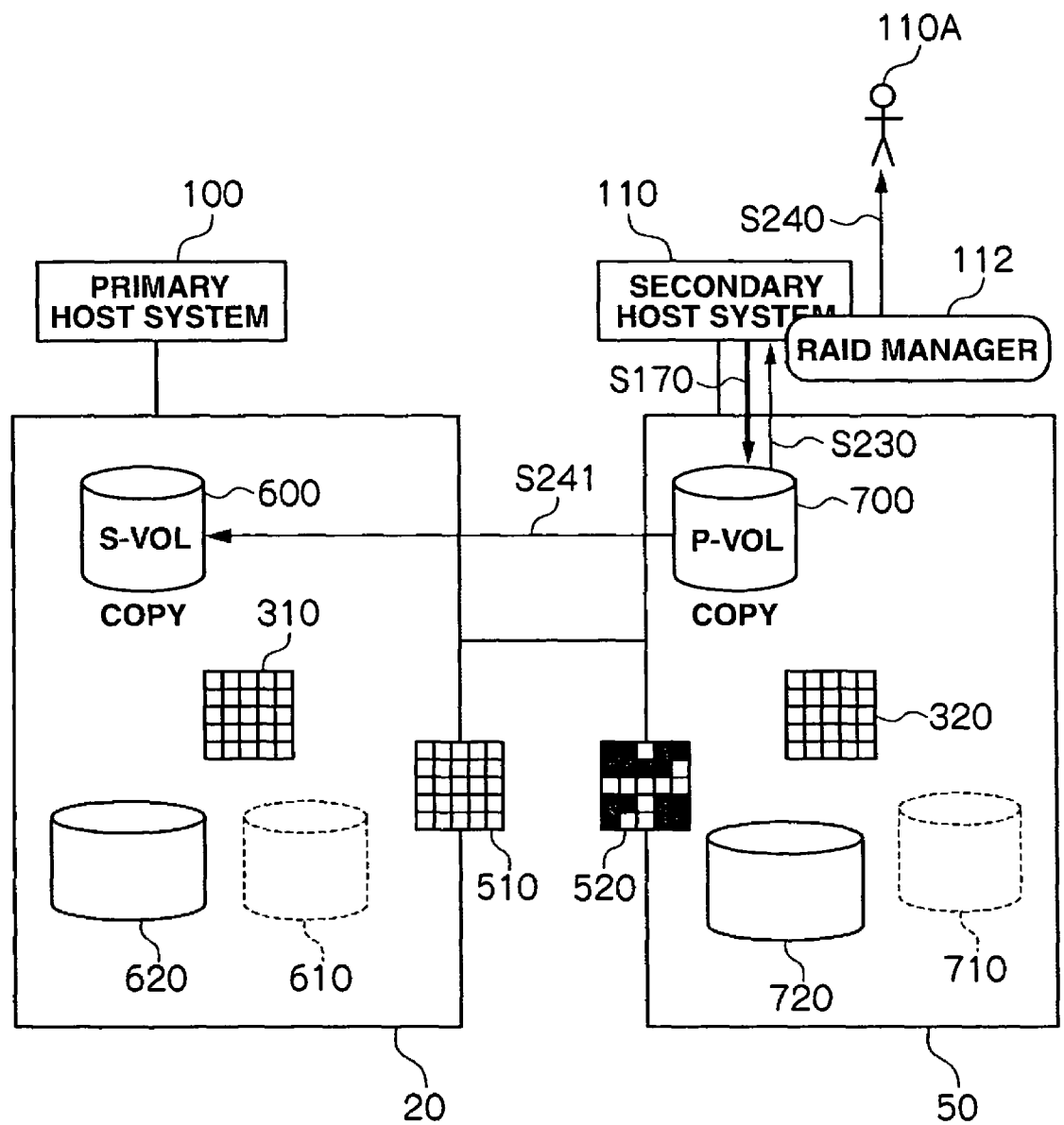
FIG. 13 is a block diagram showing a further successive step for realizing the swap function in the asynchronous remote copy.

In FIG. 13, the secondary CPU 63 gives a response S230 to the "Swap Takeover" command to the RAID manager 112. The RAID manager 112 then notifies the user 110A of start of the Swap Takeover (S240).

The secondary CPU 63 swaps the primary volume 600 and the secondary volume 700 and sets the pair information for these volumes to "COPY". The secondary CPU 63 reads data from an area in the primary volume 700 corresponding to the bit for which the flag is set and transfers the data to the secondary volume 600, in accordance with the S-VOL change bitmap 520 (S241).

This data corresponds to the difference(s) in the primary volume 700 from the secondary volume 600. Accordingly, the secondary CPU 63 can shift the standby system to the operating system by transferring only the data corresponding to this difference from the primary volume 700 to the secondary volume 600.

Figure 14:
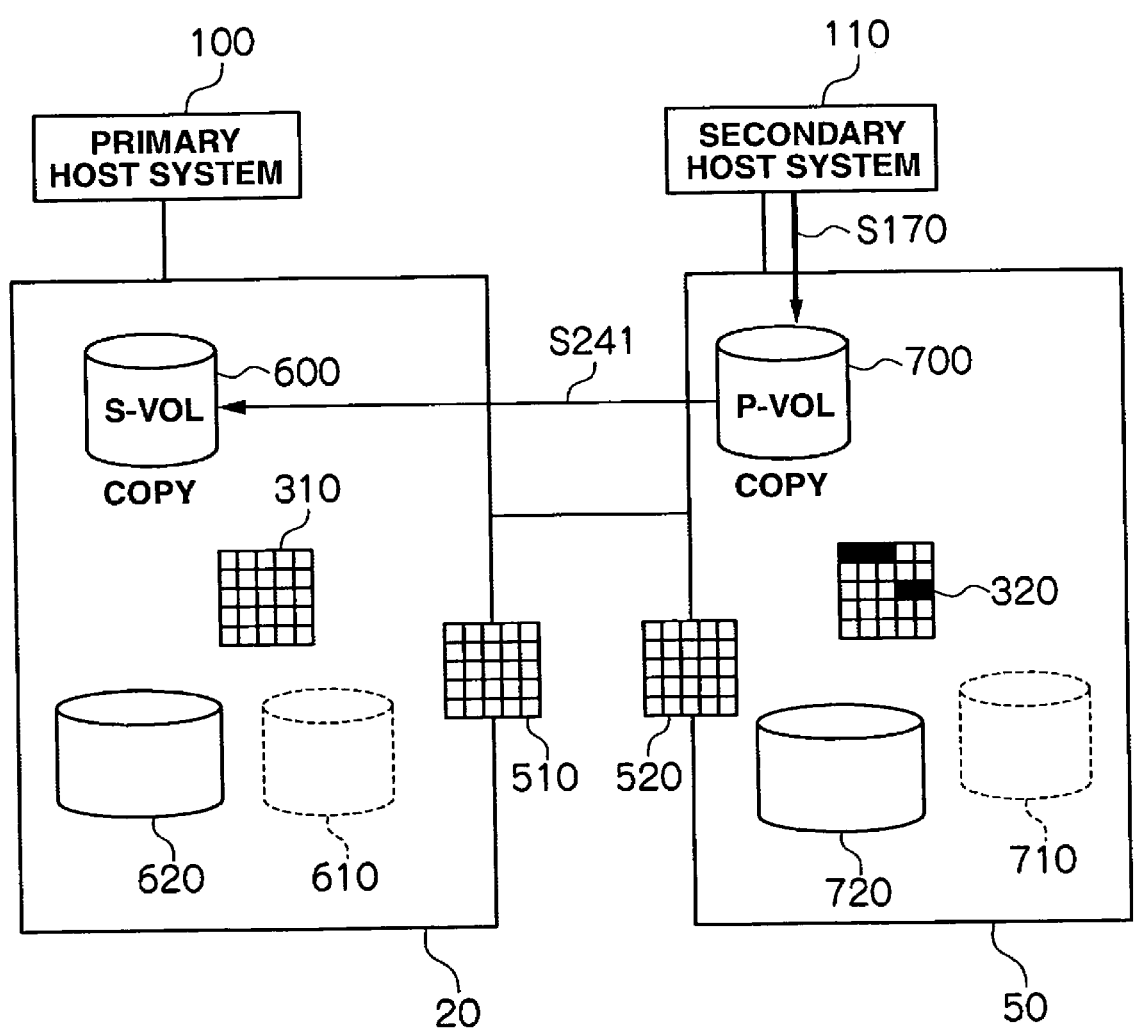
FIG. 14 is a block diagram showing a further successive step for realizing the swap function in the asynchronous remote copy.

As shown in FIG. 14, when a write command is issued by the secondary host system 110 to the secondary storage control apparatus 50 while the data is being transferred from the primary volume 700 to the secondary volume 600, the data is written to the primary volume 700, and in addition, the area in which data is updated is entered as a flag in the secondary internal snapshot bitmap 320.

The secondary CPU 63 reads each bit in the S-VOL change bitmap 520 and copies the data corresponding to the blocks where flags are set in the primary volume 700 to the secondary volume 600. The secondary CPU 63 clears the flag for the relevant block when the data transfer is complete. The secondary CPU 63 continues the data transfer for all the bits in which the flags are set in the S-VOL change bitmap 520. When checking the S-VOL change bitmap 520 and confirming that no flag is set, the secondary CPU 63 terminates the data transfer from the primary volume 700 to the secondary volume 600.

Figure 15:
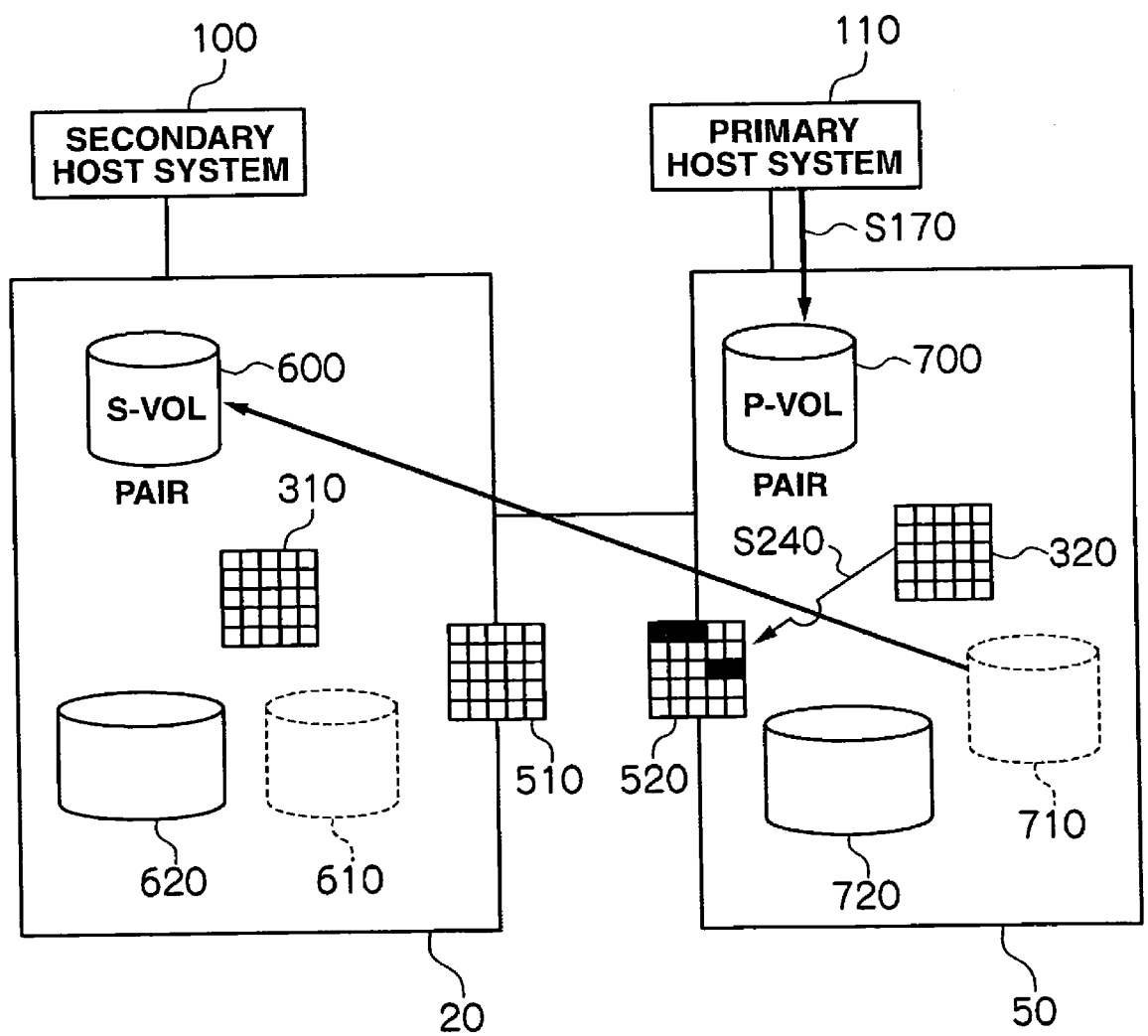
FIG. 15 is a block diagram showing a further successive step for realizing the swap function in the asynchronous remote copy.

Next, as shown in FIG. 15, when the secondary CPU 63 terminates the data transfer from the primary volume 700 to the secondary volume 600, the secondary CPU 63 changes the pair information of the primary volume 700 and the secondary volume 600 to "PAIR" where the asynchronous remote copy is performed. Then, the secondary CPU 63 copies information about difference bits where flags are set in the internal snapshot bitmap 320 to the transfer-difference bitmap 520 (S240).

Then, the secondary CPU 63 clears flags for all the difference bits in the internal snapshot bitmap 320, and the secondary host system 110 is shifted to serve as the primary host system, while the primary host system 100 is shifted to serve as the secondary host system. In accordance with these shifts, the reference numeral 20 denotes a secondary storage control apparatus while the reference numeral 50 denotes a primary storage control apparatus.

The transfer-difference bitmap 520 is the same control information as the S-VOL change bitmap. Accordingly, after the data in the primary volume 700 is copied to the secondary volume 600 and information about the data in the internal snapshot bitmap 320 is copied, the transfer-difference bitmap 520 serves not as a bitmap showing update locations in the secondary volume 700 before becoming the primary volume, but as control information managing the location of the difference data that is to be transferred from the primary volume 700 to the secondary volume 600.

Flag information in the transfer-difference bitmap 520 shows a logical address for a block in the primary volume 700 in which difference data different from the secondary volume 600 is located. Through the processing sequence above, the operating system and the standby system are swapped, and the storage control apparatus 50 serves as a main site, while the storage control apparatus 20 serves as a remote site.

Next, a supplemental description will be given below about a processing performed when a write command is issued by the secondary host system to the secondary volume while data is being restored from the pool volume to the secondary volume, during the processing for realizing the swap function in the asynchronous remote copy system described with reference to FIGS. 5 to 16. FIGS. 17A to 17E show an operation when the secondary CPU 63 receives a write command for a secondary volume block where copying of saved data is required.

Figure 17A:
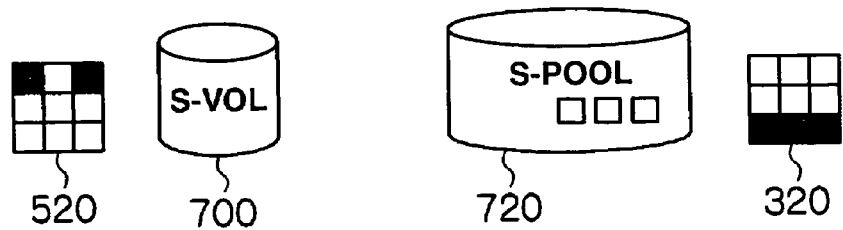
FIGS. 17A to 17E are block diagrams each showing a processing operation when a secondary host system write-accesses a secondary volume while data in a pool volume is being restored to the secondary volume.
Figure 17B:
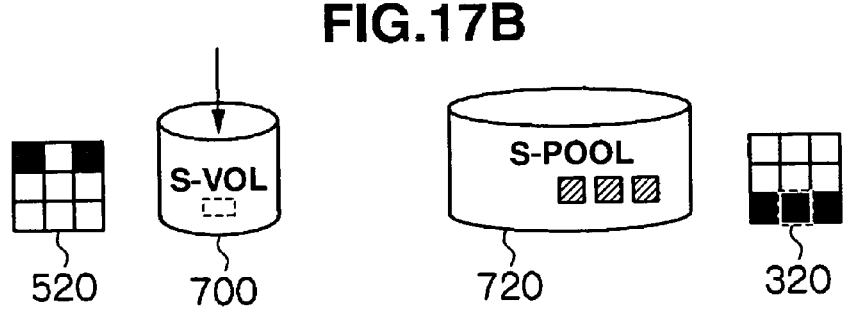
Figure 17C:
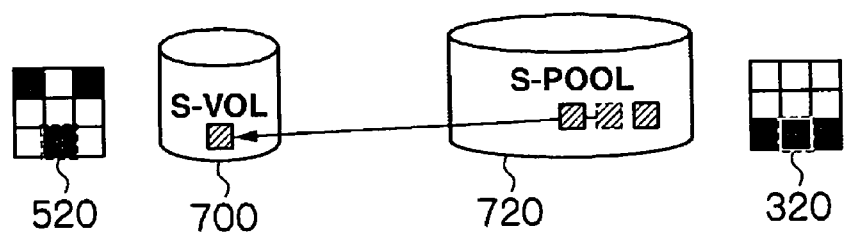

When the secondary CPU 63 receives a write command from the secondary host system 110, the CPU 63 refers to the internal snapshot bitmap 320 to check whether or not a flag is set for a bit corresponding to a secondary volume 700 block that is a target of this write command (FIGS. 17A and 17B).

Figure 17D:
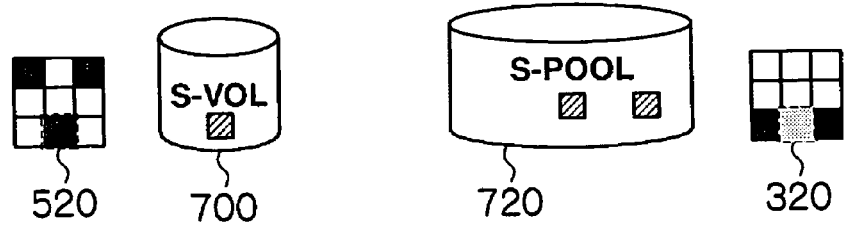
Figure 17E:
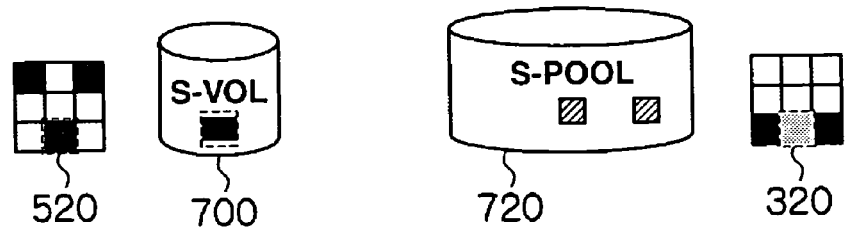

If the flag is set, saved data in the pool volume 720 has to be copied to the secondary volume 700 before the write data from the secondary host system 110 is written to the secondary volume 700. Accordingly, the secondary CPU 63 copies saved data corresponding to the bit with the flag (FIG. 17C) to the secondary volume 700, deletes this saved data from the pool volume 720, sets a flag in the corresponding bit in the S-VOL change bitmap 520, and clears the flag in the corresponding bit in the internal snapshot bitmap 320 (FIG. 17D).

Next, the secondary CPU 63 writes data corresponding to the write command to the secondary volume 700 and sets a flag for the corresponding bit in the S-VOL change bitmap 520. Since the flag has already been set for this corresponding bit, the status of the S-VOL change bitmap 520 does not change (FIG. 17E)).

Figure 18A:
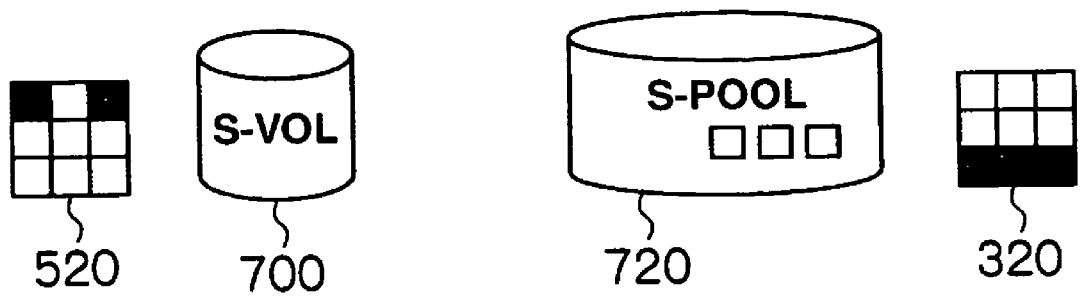
FIGS. 18A to 18C show a first modification of the above processing operation in FIGS. 17A to 17E.
Figure 18B:
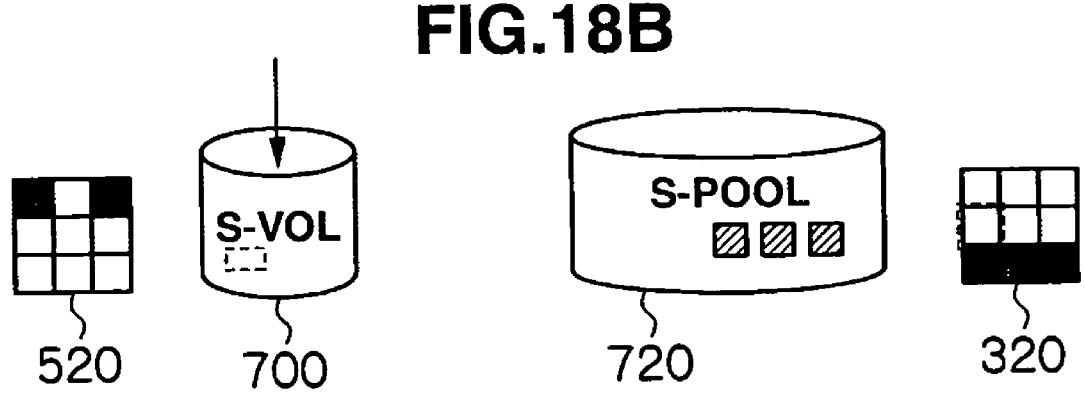
Figure 18C:
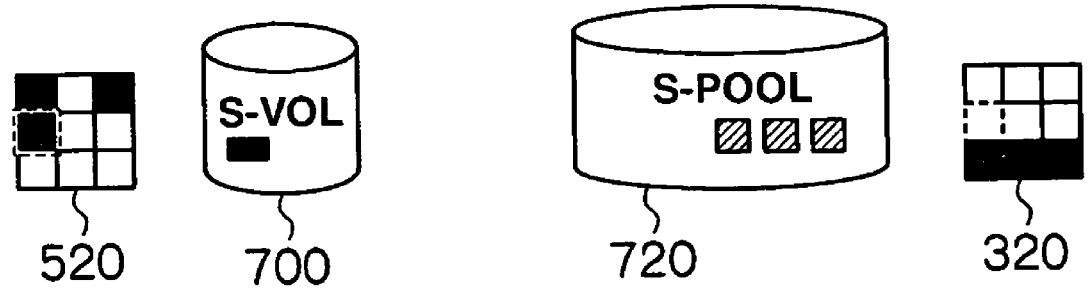

On the other hand, FIGS. 18A to 18C show an operation when the secondary CPU 63 receives a write command for a secondary volume 700 block where copying of saved data is not required. When the secondary CPU 63 receives a write command for the secondary volume 700 from the secondary host system 110, the secondary CPU 63 refers to the internal snapshot bitmap 320 to check whether or not a flag is set in a block that is a target of this write command (FIGS. 18A and 18B).

The secondary CPU 63 determines that a flag is not set and writes the write data to a certain block in the secondary volume 700. The secondary CPU 63 then sets a flag for the corresponding bit in the S-VOL change bitmap 520 (FIG. 18C).

Figure 19A:
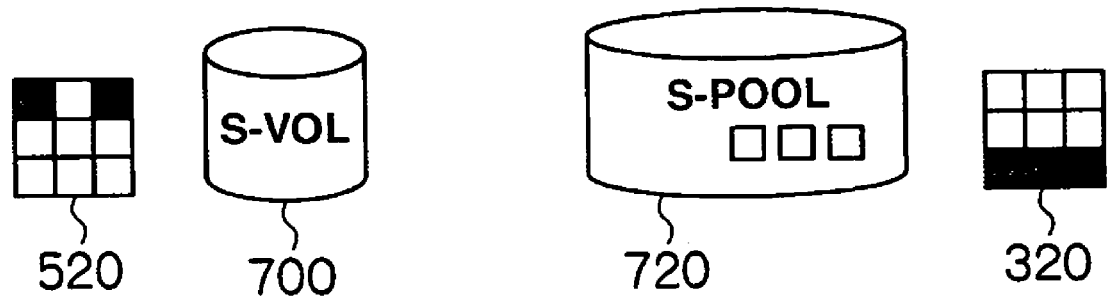
FIGS. 19A to 19C show a second modification of the above processing operation in FIGS. 17A to 17E.
Figure 19B:
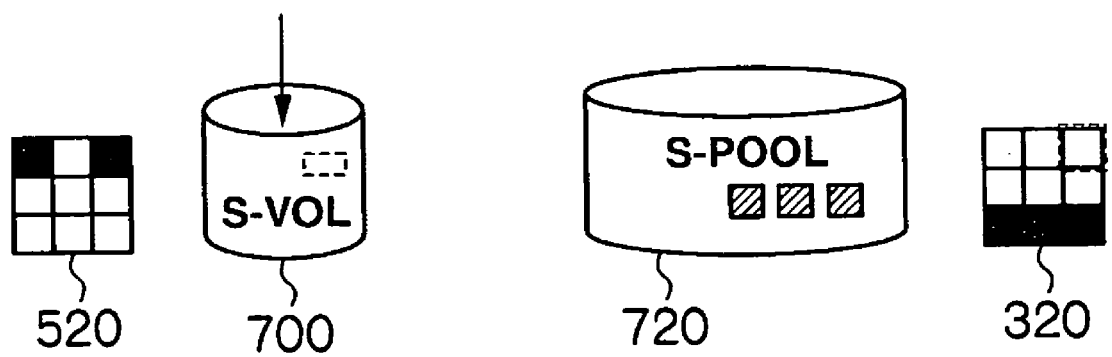
Figure 19C:
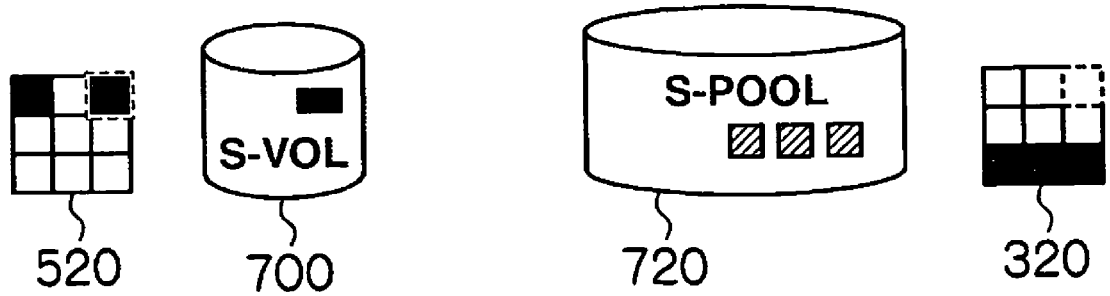

FIGS. 19A to 19C show an operation when the CPU 63 receives a write command for a secondary volume 700 block where copying of saved data has been completed. When the secondary CPU 63 receives a write command for the secondary volume 700 from the secondary host system 110, the secondary CPU 63 refers to the internal snapshot bitmap 320 to check whether or not a flag is set in a block that is a target of this write command (FIGS. 19A and 19B).

The secondary CPU 63 determines that the flag is not set and writes the write data to a certain block in the secondary volume 700. The secondary CPU 63 sets a flag in the corresponding bit in the S-VOL change bitmap 520 (FIG. 19C). However, since the flag was set for the corresponding bit in the S-VOL change bitmap 520 when the saved data was copied to the secondary volume 700, the status of the S-VOL change bitmap 520 does not change.

In FIG. 9 described earlier, the secondary CPU 63 gives an error response to the "Swap Takeover" command from the RAID manager 112 (S20), and the user 110A learns the timing when the restoration S180 is completed based on this error response and issues the "pairresync-swap" command S210 (FIG. 11) to the secondary CPU 63, thereby realizing the swap function between the primary and secondary storage control apparatuses. Alternatively, the CPU 63 may hold the "Swap Takeover" command without giving an error response to this command until the restoration is completed, and the swap function may be realized without waiting for the issue of the "pairresync-swap" command.

In the arrangement where the "Swap Takeover" command is held without giving the error response to this command until the restoration is completed, a normal response is given to the "Swap Takeover" command, even if the "Swap Takeover" command is received before the restoration is completed; the pair status is changed from "SSWS" (actually "SSWS(R)") to "COPY" (actually "COPY(R)"); and the secondary volume is shifted to serve as a primary volume, while the primary volume is shifted to serve as a secondary volume.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A control method for an asynchronous remote copy system in which, from among a plurality of storage control apparatuses, a primary volume and a secondary volume are set and data is transferred asynchronously from the primary volume to the secondary volume, the method comprising:
   a first step of setting a primary volume in a first storage control apparatus;
   a second step of setting a secondary volume in a second storage control apparatus;
   a third step of interrupting a current cycle in progress of the asynchronous remote copy from the primary volume to the secondary volume;
   a fourth step of storing data in the secondary volume;

a fifth step of determining a certain area in the secondary volume, the certain area containing data required to be copied from the secondary volume in which the data has been stored to the primary volume, the certain area including:
  an area to which primary volume difference data is written during the current asynchronous remote copy cycle;
  an area to which data is written by a second host system after the operation of a first host system is taken over by the second host system; and
  an area that corresponds to an area in the primary volume to which data is written by the first host system after the current asynchronous remote copy cycle is started and until the operation of the first host system is taken over by the second host system;
a sixth step of shifting the primary volume in the first storage control apparatus to serve as a secondary volume;
a seventh step of shifting the secondary volume in the second storage control apparatus to serve as a primary volume;
an eighth step of copying the data in the certain area to the primary volume; and
a ninth step of restarting the asynchronous remote copy from the primary volume in the second storage control apparatus to the secondary volume in the first storage control apparatus.

2. The control method for the asynchronous remote copy system according to claim 1, wherein the third step is performed when an operation of the first host system connected to the first storage control apparatus is taken over by the second host system connected to the second storage control apparatus.

3. The control method for the asynchronous remote copy system according to claim 1, wherein the fourth step includes placing the secondary volume in a status where the secondary volume contains: data from when the last cycle of the asynchronous remote copy is completed; and, in addition thereto, data that is written by the second host system to the secondary volume after the operation of the first host system is taken over by the second host system.

4. The control method for the asynchronous remote copy system according to claim 1, wherein the fourth step includes: a step of saving secondary volume data in a first volume, the secondary volume data being data stored in a secondary volume area before primary volume difference data is stored in the secondary volume area during the current asynchronous remote copy cycle; and a step of restoring the saved secondary volume data to the secondary volume.

5. A remote copy system that is an asynchronous remote copy system that asynchronously remote-copies data between a first storage system and a second storage system, wherein:
  the first storage system includes a first storage control apparatus connected to a first computer, the first storage control apparatus including a first storage device having a first logical storage area, a first memory, and a first controller;
  the second storage system includes a second storage control apparatus connected to a second computer, the second storage control apparatus including a second storage device having a second logical storage area, a second memory, and a second controller;
  the first controller recognizes the first logical storage area as a primary volume and the second logical storage area as a secondary volume, the first controller asynchronously remote-copying to the second logical storage area difference data resulting from a write access by the first computer to the first logical storage area;
  the second controller stores, during the execution of the asynchronous remote copy, in the second memory, based on a command from the second computer that has taken over an operation of the first computer, control information for matching a data image of the first logical storage area with a data image of the second logical storage area with the second logical storage area being a primary volume and the first logical storage area being a secondary volume;
  based on the control information, the second controller copies, to the first logical storage area, data in the second logical storage area from when the last asynchronous remote copy cycle is completed;
  the second memory stores management information for managing a certain block in the second logical storage area, the certain block containing data to be copied to the first logical storage area, the certain block including:
    a block to which difference data in the first logical storage area is written during the current asynchronous remote copy cycle;
    a block to which data is written by the second computer after the operation of the first computer is taken over by the second computer; and
    a block corresponding to a block in the first logical storage area to which data is written by the first computer after the current asynchronous remote copy cycle is started and until the operation of the first computer is taken over by the second computer; and
  the second controller copies the data in the certain block in the second logical storage area to the first logical storage area based on the management information.

6. The remote copy system according to claim 5, wherein the first controller includes: a first management unit that manages a block in the first logical storage area that is updated by storing data written by the first computer; a first save volume in which data before the data writing by the first computer is saved; and a second management unit that manages a block in the first logical storage area that stores difference data to be transferred to the second logical storage area in the asynchronous remote copy.

7. The remote copy system according to claim 6, wherein the second controller includes a third management unit that manages a block in the second logical storage area that is updated by storing data written by the second computer; a fourth management unit that manages a block in the second logical storage area to which the difference data is written; and a second save volume in which data before the difference data is written is saved.

8. The remote copy system according to claim 7, wherein the second controller enters management information for the fourth management unit in the third management unit.

9. The remote copy system according to claim 8, wherein the second controller restores saved data in the second save volume to the second logical storage area.

10. The remote copy system according to claim 8, wherein the second controller enters in the third management unit management information for the first management unit and management information for the second management unit.

* * * * *